United States Patent
Kramer

(10) Patent No.: US 10,214,684 B2
(45) Date of Patent: Feb. 26, 2019

(54) FRICTION REDUCERS AND WELL TREATMENT FLUIDS

(71) Applicant: BWA WATER ADDITIVES UK LIMITED, Manchester (GB)

(72) Inventor: Jeffrey Frank Kramer, Tucker, GA (US)

(73) Assignee: BWA WATER ADDITIVES UK LIMITED, Manchester (GB)

( * ) Notice: Subject to any disclaimer, the term of this patent is extended or adjusted under 35 U.S.C. 154(b) by 210 days.

(21) Appl. No.: 14/870,951

(22) Filed: Sep. 30, 2015

(65) Prior Publication Data

US 2017/0088770 A1    Mar. 30, 2017

(51) Int. Cl.

| C09K 8/68 | (2006.01) |
|---|---|
| C09K 8/88 | (2006.01) |
| C09K 8/035 | (2006.01) |
| C09K 8/60 | (2006.01) |
| C09K 8/62 | (2006.01) |
| E21B 43/16 | (2006.01) |

(52) U.S. Cl.
CPC .............. C09K 8/882 (2013.01); C09K 8/035 (2013.01); C09K 8/602 (2013.01); C09K 8/605 (2013.01); C09K 8/62 (2013.01); C09K 8/68 (2013.01); C09K 8/885 (2013.01); E21B 43/16 (2013.01); C09K 2208/28 (2013.01)

(58) Field of Classification Search
CPC ........ C09K 8/035; C09K 8/882; C09K 8/602; C09K 8/605; C09K 8/62; C09K 8/68; C09K 8/885; C09K 2208/28; E21B 43/16
See application file for complete search history.

(56) References Cited

U.S. PATENT DOCUMENTS

| 3,281,365 A | 10/1966 | Moedritzer |
|---|---|---|
| 4,835,143 A | 5/1989 | Donofrio et al. |
| 4,874,526 A | 10/1989 | Grade et al. |
| 5,102,874 A | 4/1992 | Lintner et al. |
| 5,376,731 A | 12/1994 | Kerr et al. |
| 5,741,757 A | 4/1998 | Cooper et al. |
| 6,241,898 B1 | 6/2001 | Wright et al. |
| 6,669,904 B1 | 12/2003 | Yang et al. |
| 6,784,168 B1* | 8/2004 | Jones ............... A01N 57/34 514/104 |

(Continued)

FOREIGN PATENT DOCUMENTS

| EP | 0209260 A2 | 1/1987 |
|---|---|---|
| EP | 0479465 A2 | 4/1992 |

(Continued)

OTHER PUBLICATIONS

U.S. Appl. No. 14/513,693, Oct. 14, 2014, Kramer.

(Continued)

*Primary Examiner* — Aiqun Li
(74) *Attorney, Agent, or Firm* — McNees Wallace & Nurick LLC

(57) ABSTRACT

The present invention relates to friction reducers and to well treatment fluids. In one embodiment there is provided a friction reducing composition comprising (a) a phosphonium compound and (b) a polymeric friction reducer. In a further embodiment there is provided a well treatment fluid comprising a phosphonium compound.

14 Claims, 1 Drawing Sheet

(56) References Cited

U.S. PATENT DOCUMENTS

| | | | |
|---|---|---|---|
| 6,926,836 B2* | 8/2005 | Fidoe | C02F 5/14 134/3 |
| 2006/0113251 A1 | 6/2006 | McGuire et al. | |
| 2010/0200239 A1 | 8/2010 | Aften | |
| 2010/0226874 A1 | 9/2010 | Kramer et al. | |
| 2011/0174492 A1* | 7/2011 | Robb | C09K 8/524 166/308.2 |
| 2012/0073821 A1* | 3/2012 | Holtsclaw | C09K 8/035 166/310 |
| 2012/0289436 A1 | 11/2012 | Woodward et al. | |
| 2014/0194335 A1 | 7/2014 | Gu et al. | |
| 2015/0157024 A1 | 6/2015 | Martin | |

FOREIGN PATENT DOCUMENTS

| | | |
|---|---|---|
| EP | 0681995 A1 | 10/1994 |
| GB | 2354771 A | 4/2001 |
| JP | 10273408 A | 10/1998 |
| WO | 9104668 A1 | 4/1991 |
| WO | 2005123607 A1 | 12/2005 |
| WO | 2010100470 A2 | 9/2010 |

OTHER PUBLICATIONS

U.S. Appl. No. 14/513,735, Oct. 14, 2014, Kramer.
U.S. Appl. No. 14/513,768, Oct. 14, 2014, Kramer.
U.S. Appl. No. 14/673,419, Mar. 30, 2015, Kramer et al..
U.S. Appl. No. 14/840,674, Aug. 31, 2015, Kramer.
U.S. Appl. No. 14/872,399, Oct. 1, 2015, Kramer.
U.S. Appl. No. 14/874,686, Oct. 5, 2015, Kramer et al..
U.S. Appl. No. 14/878,240, Oct. 8, 2015, Kramer et al..

BWA Water Additives, "Product Label for Bellacide © 303," http://www.kellysolutions.com/erenewals/documentsubmit/KellyData%5COK%5Cpesticide%5CProduct%20Labe1%5C83451%5 C83451-20%5C83451-20 Bellacide 303 6 16 2011_2_54_43_PM.pdf.

BWA Water Additives, " Product Information for Bellacide © 303—Multi-purpose Non-oxidizing Biocide for Industrial Water Systems," http://www.wateradditives.com/Repository/Files/BWA_Bellacide_303_GP_WF_-_AsiaPac_O.pdf.

BWA Water Additives, "Technical Data for Bellacide © 303—Multi-purpose Non-oxidizing Biocide for Industrial Water Systems," http://www.wateradditives.com/Repository/Files/BWA_Bellacide_303_TI_WF_AsiaPac.pdf.

Kull, F C. et al., "Mixtures of Quaternary Ammonium Compounds and Long-chain Fatty Acids as Antifungal Agents," Applied Microbiology, Nov. 1961, pp. 538-541, vol. 9, No. 6, The American Society for Microbiology by The Williams & Wilkins Company, Baltimore, MD.

May, Oscar W., "Polymeric Antimicrobial Agents," Disinfection, Sterilization, and Preservation, Chapter 18, Jan. 1, 1991, pp. 322-333, Philadelphia, Lea & Febiger, US.

Rembaum, A, "Biological Activity of Ionene Polymers," Applied Polymer Symposium, 1973, pp. 299-317, No. 22, J. Wiley & Sons, Inc., New York, NY.

U.S. Appl. No. 12/399,300, Final Office Action dated Feb. 23, 2016, 14 pages.

U.S. Appl. No. 14/513,693, Non-Final Office Action dated Feb. 26, 2016, 11 pages.

Giri, Jitendra et al., "Effluents from Paper and Pulp Industries and their impact on soil properties and chemical composition of plants in Uttarakhand, India," Journal of Environment and Waste Management, May 2014, pp. 026-032, vol. 1, No. 1, www.premierpublishers.org.

* cited by examiner

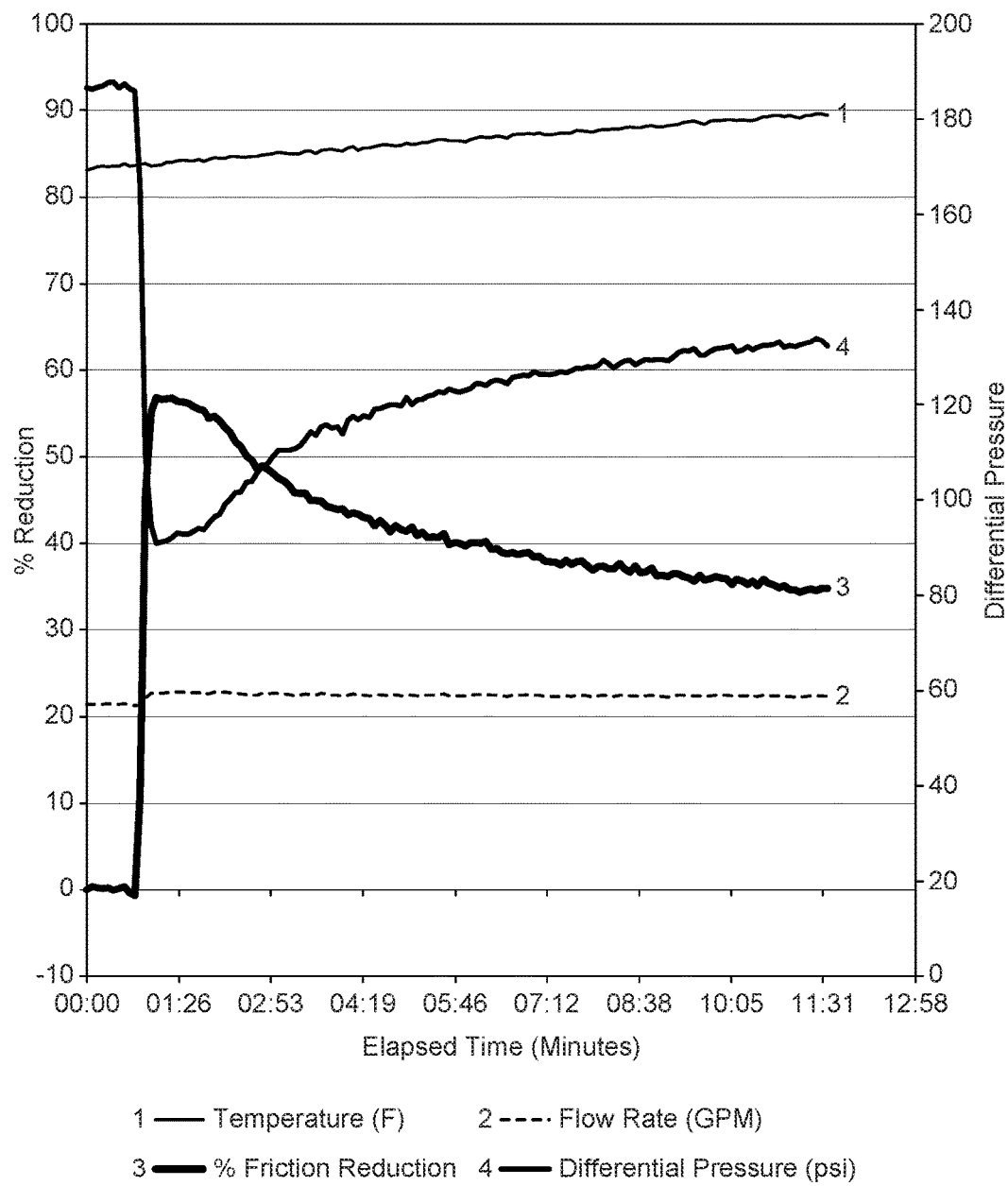

FRICTION REDUCERS AND WELL TREATMENT FLUIDS

FIELD OF INVENTION

The present invention relates to friction reducers and to well treatment fluids, particularly, though not exclusively, to well treatment fluids comprising friction reducers and to methods of use thereof.

BACKGROUND TO INVENTION

In order to extract oil and gas from geological formations it is known to pump well treatment fluids into wells. One known process of extraction is hydraulic fracturing, also known as fracing. In the fracing process a well treatment fluid is pumped through a well bore hole into a geological formation at a pressure which causes the creation and opening up of fractures in the geological formation.

Well treatment fluids are typically pumped into wells at high pressures and with high flow rates. As a well treatment fluid is pumped through a well it experiences friction. For example, friction is produced due to the interaction between the fluid and the well bore lining and by turbulent flow. Such friction means that greater energy must be used to pump the fluid than would be required to pump the same amount of fluid at the same flow rate in the absence of such friction.

In order to reduce friction it is known to add friction reducers to well treatment fluids. Typically, well treatment fluids comprise an aqueous fluid to which a polymeric friction reducer is added. US2010/0200239 describes the use of a combination of polymeric friction reducer and 3,5-dimethyl-1,3,5-thiadiazinane-2-thione in a well treatment fluid.

Although well treatment fluids comprising friction reducers are known there remains a need for improved well treatment fluids and friction reducers. Accordingly, the present invention aims to address at least one disadvantage associated with the prior art whether discussed herein or otherwise.

SUMMARY OF INVENTION

According to a first aspect of the present invention there is provided a friction reducing composition comprising:
(a) a phosphonium compound; and
(b) a polymeric friction reducer.

Suitably, the friction reducing composition comprises an aqueous composition comprising:
(a) a phosphonium compound; and
(b) a polymeric friction reducer.

Suitably, the friction reducing composition is adapted to reduce frictional losses due to friction between a fluid to which it is added and a pipe or well bore when said fluid is in turbulent flow through said pipe or well bore in use.

Suitably, the friction reducing composition is adapted to reduce friction of a fluid to which it is added by at least 10%. Suitably, the friction reducing composition is adapted to reduce friction of a fluid to which it is added by at least 10% when determined using measurements of differential pressure across a test section versus flow rate and wherein the friction reduction is calculated 5 minutes after addition using the equation: (Differential pressure/Flow corrected base differential pressure)×100 =% Friction reduction.

Suitably, the friction reducing composition is adapted to reduce friction of a fluid to which it is added by at least 20%, for example by at least 30%, for example by at least 40%.

Suitably, the friction reducing composition comprises water in an amount of at least 10% by weight, for example at least 50% by weight.

Suitably, the polymeric friction reducer (b) comprises a polymer that reduces frictional losses due to friction between a pipe or well bore and a fluid in turbulent flow through said pipe or well bore in use.

Suitably, the polymeric friction reducer (b) comprises a polymer that reduces friction of a fluid to which it is added by at least 10%. Suitably, the polymeric friction reducer (b) comprises a polymer that reduces friction of a fluid to which it is added by at least 10% when determined using measurements of differential pressure across a test section versus flow rate and wherein the friction reduction is calculated 5 minutes after addition using the equation: (Differential pressure/Flow corrected base differential pressure)×100=% Friction reduction.

Suitably, the polymeric friction reducer (b) comprises a polymer that reduces friction of a fluid to which it is added by at least 20%, for example by at least 30%, for example by at least 40%.

The friction reducing composition may comprise a combination of polymeric friction reducers (b). Suitably, the friction reducing composition comprises a single polymeric friction reducer (b).

Suitably, the polymeric friction reducer (b) comprises a high molecular weight polymer. Suitably, the polymeric friction reducer (b) comprises a high molecular weight polymer having a number average molecular weight of from 12 million to 14 million. Suitably, the polymeric friction reducer (b) comprises a very high molecular weight polymer. Suitably, the polymeric friction reducer (b) comprises a very high molecular weight polymer having a number average molecular weight of at least 16 million.

Suitably, the polymeric friction reducer (b) comprises an emulsion polymer.

Suitably, the polymeric friction reducer (b) comprises a charged polymer.

The polymeric friction reducer (b) may comprises a cationic polymer. Suitably, the polymeric friction reducer (b) comprises an anionic polymer.

Suitably, the polymeric friction reducer (b) is selected from the group consisting of polymers and/or copolymers of acrylamides, acrylates, isobutylene, ethylene oxide and guar gum and combinations thereof.

Suitably, the polymeric friction reducer (b) comprises a polyacrylamide.

Suitably, as used herein, the term "polyacrylamide" refers to acrylamide polymers and to acrylamide and acrylic acid copolymers.

Suitably, the polymeric friction reducer (b) comprises a polyacrylamide which comprises a copolymer of acrylamide and acrylic acid. Suitably, the polymeric friction reducer (b) comprises a polyacrylamide which consists of a copolymer of acrylamide and acrylic acid.

Suitably, the polymeric friction reducer (b) comprises a copolymer of acrylamide and acrylic acid. The polymeric friction reducer (b) may consist of a copolymer of acrylamide and acrylic acid.

The polymeric friction reducer (b) may comprise an acrylamide polymer. The polymeric friction reducer (b) may consist of an acrylamide polymer.

The polymeric friction reducer (b) may comprise a combination of an acrylamide polymer and an acrylamide and acrylic acid copolymer. The polymeric friction reducer (b) may consist of a combination of an acrylamide polymer and an acrylamide and acrylic acid copolymer.

Suitably, the friction reducing composition comprises a polymeric friction reducer (b) which comprises an anionic acrylamide/acrylic acid copolymer.

Suitably, the polymeric friction reducer (b) comprises a high molecular weight anionic polyacrylamide. Suitably, the polymeric friction reducer (b) comprises a very high molecular weight anionic polyacrylamide.

Suitably, the friction reducing composition is such that a polyacrylamide comprises greater than 50% of the total polymeric friction reducer(s) in the friction reducing composition. Suitably, the friction reducing composition is such that a polyacrylamide comprises greater than 90% of the total polymeric friction reducer(s) in the friction reducing composition, for example 99% or greater.

Suitably, the polymeric friction reducer (b) consists of a polyacrylamide. Suitably, the polymeric friction reducer (b) consist of a high molecular weight anionic polyacrylamide. Suitably, the polymeric friction reducer (b) consist of a very high molecular weight anionic polyacrylamide.

Suitably, the friction reducing composition comprises a polymeric friction reducer (b) in an amount of at least 10 ppm. The friction reducing composition may comprise a polymeric friction reducer (b) in an amount of at least 100 ppm.

As used herein, all references to ppm refer to parts per million by weight unless stated otherwise.

Suitably, the friction reducing composition comprises a polyacrylamide in an amount of at least 10 ppm. The friction reducing composition may comprise a polyacrylamide in an amount of at least 100 ppm.

Suitably, the friction reducing composition comprises a high molecular weight or very high molecular weight anionic polyacrylamide in an amount of at least 10 ppm. The friction reducing composition may comprise a high molecular weight or very high molecular weight anionic polyacrylamide in an amount of at least 100 ppm.

Suitably, the friction reducing composition comprises a high molecular weight or very high molecular weight anionic acrylamide and acrylic acid copolymer in an amount of at least 10 ppm. The friction reducing composition may comprise a high molecular weight or very high molecular weight anionic acrylamide and acrylic acid copolymer in an amount of at least 100 ppm.

The friction reducing composition may comprise a combination of phosphonium compounds (a). Suitably, the friction reducing composition comprises a single phosphonium compound (a).

Suitably, the friction reducing composition comprises a phosphonium compound (a) having formula:

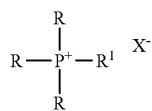

wherein each R is independently a $C_1$-$C_6$ alkyl group which is unsubstituted or substituted by a cyano, hydroxyl, esterified hydroxyl or aryl group;

$R^1$ represents a $C_8$-$C_{18}$ alkyl group which is substituted or unsubstituted; and X represents either chlorine or bromine.

Suitably, each R is a $C_1$-$C_6$ alkyl group. Suitably, each R is a $C_3$-$C_5$ alkyl group. Suitably each R is a butyl group.

Suitably $R^1$ represents a $C_8$-$C_{18}$ alkyl group. Suitably, R1 is a $C_{12}$-$C_{16}$ alkyl group. Suitably, $R^1$ is a tetradecyl group.

Suitably, X is chlorine.

Suitably, the friction reducing composition comprises a phosphonium compound (a) which is a phosphonium chloride.

Suitably, the friction reducing composition is such that a phosphonium chloride comprises greater than 50% of the total phosphonium compound(s) in the friction reducing composition. Suitably, the friction reducing composition is such that a phosphonium chloride comprises greater than 90% of the total phosphonium compound(s) in the friction reducing composition, for example 99% or greater.

Suitably, the friction reducing composition comprises a phosphonium chloride as the only phosphonium compound (a).

Suitably, the phosphonium compound (a) comprises tri n-butyl n-tetradecyl phosphonium chloride (hereafter "TTPC"). Suitably, the phosphonium compound (a) consists of TTPC.

Suitably, the friction reducing composition comprises an aqueous composition containing the phosphonium compound (a). Suitably, the friction reducing composition comprises an aqueous composition of TTPC.

Suitably, the friction reducing composition comprises a phosphonium compound (a) in an amount of at least 5 ppm. Suitably, the friction reducing composition comprises a phosphonium compound (a) in an amount of at least 10 ppm. The friction reducing composition may comprise a phosphonium compound (a) in an amount of at least 100 ppm.

Suitably, the friction reducing composition comprises TTPC in an amount of at least 5 ppm. Suitably, the friction reducing composition comprises TTPC in an amount of at least 10 ppm. The friction reducing composition may comprise TTPC in an amount of at least 100 ppm.

Suitably, there is provided a friction reducing composition comprising:
(a) TTPC; and
(b) a polymeric friction reducer.

Suitably, there is provided a friction reducing composition comprising:
(a) a phosphonium compound; and
(b) a polyacrylamide.

Suitably, there is provided a friction reducing composition comprising:
(a) TTPC; and
(b) a polyacrylamide.

Suitably, there is provided an aqueous friction reducing composition comprising:
(a) TTPC; and
(b) a polyacrylamide.

Suitably, there is provided an aqueous friction reducing composition comprising:
(a) TTPC; and
(b) an acrylamide and acrylic acid copolymer.

Suitably, the friction reducing composition comprises a polymeric ammonium compound and/or an amphoteric surfactant.

Suitably, the friction reducing composition comprises:
(a) a phosphonium compound;
(b) a polymeric friction reducer; and
(c) a polymeric ammonium compound;

Suitably, the friction reducing composition comprises one or more polymeric ammonium compounds (c). Suitably, the friction reducing compound comprises a single polymeric ammonium compound (c).

Suitably, the friction reducing composition comprises a polymeric ammonium compound (c) having formula:

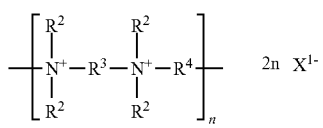

wherein each $R^2$ is independently a methyl group;

$R^3$ represents a $C_2$-$C_{12}$ alkyl group;

$R^4$ represents a $C_2$-$C_{12}$ alkyl group, a diethyl ether group, an isopropanol group or a N,N-dipropylurea group;

$X^1$ represents either chlorine or bromine; and n is 2-40.

Suitably, each $R^2$ is independently a methyl group.

Suitably, $R^3$ represents a $C_2$-$C_{12}$ alkyl group which is substituted or unsubstituted, suitably unsubstituted. Suitably, $R^3$ represents a $C_2$-$C_{12}$ alkyl group. Suitably, $R^3$ is a $C_2$-$C_4$ alkyl group. Suitably, $R^3$ is a $C_2$ alkyl group.

Suitably, $R^4$ represents a $C_2$-$C_{12}$ alkyl group which is substituted or unsubstituted, suitably unsubstituted. Suitably, $R^4$ represents a $C_2$-$C_{12}$ alkyl group, a diethyl ether group, an isopropanol group or a N,N-dipropylurea group. Suitably, $R^4$ represents a diethyl ether group.

Suitably, $X^1$ is chlorine.

Suitably, n is 10-30. Suitably, n is 15-25. Suitably, n is 20.

Suitably, the friction reducing composition comprises Poly[oxyethylene(dimethylimino)ethylene(dimethylimino)ethylene dichloride] (also known as "polyquat").

Suitably, the polymeric ammonium compound (c) comprises Poly[oxyethylene(dimethylimino)ethylene(dimethylimino)ethylene dichloride].

Suitably, the polymeric ammonium compound (c) consists of Poly[oxyethylene(dimethylimino)ethylene(dimethylimino)ethylene dichloride].

Suitably, the friction reducing composition comprises a polymeric ammonium compound (c) in an amount of at least 1 ppm. The friction reducing composition may comprise a polymeric ammonium compound (c) in an amount of at least 10 ppm. The friction reducing composition may comprise a polymeric ammonium compound (c) in an amount of at least 100 ppm.

Suitably, the friction reducing composition comprises Poly[oxyethylene(dimethylimino)ethylene(dimethylimino)ethylene dichloride] in an amount of at least 1 ppm. The friction reducing composition may comprise Poly[oxyethylene(dimethylimino)ethylene(dimethylimino)ethylene dichloride] in an amount of at least 10 ppm. The friction reducing composition may comprise Poly[oxyethylene(dimethylimino)ethylene(dimethylimino)ethylene dichloride] in an amount of at least 100 ppm.

Suitably, there is provided a friction reducing composition comprising:
(a) TTPC;
(b) a polymeric friction reducer; and
(c) a polymeric ammonium compound.

Suitably, there is provided a friction reducing composition comprising:
(a) a phosphonium compound;
(b) a polyacrylamide; and
(c) a polymeric ammonium compound.

Suitably, there is provided a friction reducing composition comprising:
(a) TTPC;
(b) a polyacrylamide; and
(c) a polymeric ammonium compound.

Suitably, there is provided a friction reducing composition comprising:
(a) TTPC;
(b) a polyacrylamide; and
(c) Poly[oxyethylene(dimethylimino)ethylene(dimethylimino)ethylene dichloride].

Suitably, there is provided an aqueous friction reducing composition comprising:
(a) TTPC;
(b) a polyacrylamide; and
(c) Poly[oxyethylene(dimethylimino)ethylene(dimethylimino)ethylene dichloride].

Suitably, there is provided an aqueous friction reducing composition comprising:
(a) TTPC;
(b) an acrylamide and acrylic acid copolymer; and
(c) Poly[oxyethylene(dimethylimino)ethylene(dimethylimino)ethylene dichloride].

Suitably, the friction reducing composition comprises:
(a) a phosphonium compound;
(b) a polymeric friction reducer;
(c) a polymeric ammonium compound; and
(d) an amphoteric surfactant.

Suitably, the friction reducing composition comprises one or more amphoteric surfactants (d). Suitably, the friction reducing compound comprises a single amphoteric surfactant (d).

Suitably, the amphoteric surfactant (d) is selected from the group consisting of alkyl ampho- or iminodicarboxylate amphoteric surfactants. Suitably, the amphoteric surfactant (d) is selected from the group consisting of alkyl iminodipropionate amphoteric surfactants.

Suitably, the amphoteric surfactant (d) comprises an alkyl iminodipropionate amphoteric surfactant.

Suitably, the amphoteric surfactant (d) comprises an alkyl iminodipropionate amphoteric surfactant wherein the alkyl group is selected from the group consisting of 2-ethylhexyl-, octyl-, decyloxypropyl-, dodecyl-, coco- or tallow.

Suitably, the amphoteric surfactant (d) consists of an alkyl iminodipropionate amphoteric surfactant.

Suitably, the amphoteric surfactant (d) consists of an alkyl iminodipropionate amphoteric surfactant wherein the alkyl group is selected from the group consisting of 2-ethylhexyl-, octyl-, decyloxypropyl-, dodecyl-, coco- or tallow.

Suitably, the friction reducing composition comprises an amphoteric surfactant (d) in an amount of at least 1 ppm. The friction reducing composition may comprise an amphoteric surfactant (d) in an amount of at least 10 ppm. The friction reducing composition may comprise an amphoteric surfactant (d) in an amount of at least 100 ppm.

Suitably, the friction reducing composition comprises an alkyl iminodipropionate amphoteric surfactant in an amount of at least 1 ppm. The friction reducing composition may comprise an alkyl iminodipropionate amphoteric in an amount of at least 10 ppm. The friction reducing composition may comprise an alkyl iminodipropionate amphoteric surfactant in an amount of at least 100 ppm.

Suitably, there is provided a friction reducing composition comprising:
(a) TTPC;
(b) a polymeric friction reducer;
(c) a polymeric ammonium compound; and
(d) an amphoteric surfactant.

Suitably, there is provided a friction reducing composition comprising:
(a) a phosphonium compound;
(b) a polyacrylamide;
(c) a polymeric ammonium compound; and
(d) an amphoteric surfactant.

Suitably, there is provided a friction reducing composition comprising:
(a) TTPC;
(b) a polyacrylamide;
(c) a polymeric ammonium compound; and
(d) an amphoteric surfactant.

Suitably, there is provided a friction reducing composition comprising:
(a) TTPC;
(b) a polyacrylamide; and
(c) Poly[oxyethylene(dimethylimino)ethylene(dimethylimino)ethylene dichloride]; and
(d) an amphoteric surfactant.

Suitably, there is provided a friction reducing composition comprising:
(a) TTPC;
(b) a polyacrylamide; and
(c) Poly[oxyethylene(dimethylimino)ethylene(dimethylimino)ethylene dichloride]; and
(d) an alkyl iminodipropionate amphoteric surfactant.

Suitably, there is provided an aqueous friction reducing composition comprising:
(a) TTPC;
(b) a polyacrylamide; and
(c) Poly[oxyethylene(dimethylimino)ethylene(dimethylimino)ethylene dichloride]; and
(d) an alkyl iminodipropionate amphoteric surfactant.

Suitably, there is provided an aqueous friction reducing composition comprising:
(a) TTPC;
(b) an acrylamide and acrylic acid copolymer; and
(c) Poly[oxyethylene(dimethylimino)ethylene(dimethylimino)ethylene dichloride]; and
(d) an alkyl iminodipropionate amphoteric surfactant.

Suitably, the friction reducing composition comprises water, a phosphonium compound and a polymeric friction reducer in a combined amount of at least 90% by weight of the composition.

Suitably, the friction reducing composition comprises water, a phosphonium compound, a polymeric friction reducer and optionally a polymeric ammonium compound and/or an amphoteric surfactant in a combined amount of at least 95% by weight of the composition. Suitably, the friction reducing composition comprises water, a phosphonium compound, a polymeric friction reducer and optionally a polymeric ammonium compound and/or an amphoteric surfactant in a combined amount of at least 99% by weight of the composition. Suitably, the friction reducing composition comprises water, a phosphonium compound, a polymeric friction reducer and optionally a polymeric ammonium compound and/or an amphoteric surfactant in a combined amount of at least 99.9% by weight of the composition.

The friction reducing composition may comprise water, a phosphonium compound, a polymeric friction reducer and a polymeric ammonium compound in a combined amount of at least 99% by weight of the composition. The friction reducing composition may comprise water, a phosphonium compound, a polymeric friction reducer and a polymeric ammonium compound in a combined amount of at least 99.9% by weight of the composition. The friction reducing composition may consist of water, a phosphonium compound, a polymeric friction reducer and a polymeric ammonium compound.

The friction reducing composition may comprise water, a phosphonium compound and a polymeric friction reducer in a combined amount of at least 99% by weight of the composition. The friction reducing composition may comprise water, a phosphonium compound and a polymeric friction reducer in a combined amount of at least 99.9% by weight of the composition. The friction reducing composition may consist of water, a phosphonium compound and a polymeric friction reducer.

The friction reducing composition may comprise a synergistic mixture of phosphonium compound (a) and polymeric friction reducer (b). Suitably, by "synergistic mixture" it is meant that the mixture of (a) and (b) has a synergistic effect on friction reduction.

It has been found that the composition of the present invention may in particular be efficacious in reducing friction in well treatment fluids, in use.

Surprisingly, it has been found that when phosphonium compound (a) and polymeric friction reducer (b) are combined the resulting combination may pose a greater reduction in friction in well treatment fluids, in use, than (b) alone.

Surprisingly, it has been found that when phosphonium compound (a) and polymeric friction reducer (b) and polymeric ammonium compound (c) are combined the resulting combination may pose a greater reduction in friction in well treatment fluids, in use, than (b) alone. The combination may be particularly effective when used with fresh water well treatment fluids.

Surprisingly, it has been found that when phosphonium compound (a) and polymeric friction reducer (b) and polymeric ammonium compound (c) and amphoteric surfactant (d) are combined the resulting combination may pose a greater reduction in friction in well treatment fluids, in use, than (b) alone.

According to a second aspect of the present invention there is provided a well treatment fluid comprising a phosphonium compound.

The well treatment fluid may comprise a phosphonium compound added to the well treatment fluid in the form of an aqueous composition.

Suitably, the well treatment fluid comprises a polymeric friction reducer. The well treatment fluid may comprise a polymeric friction reducer added to the well treatment fluid in the form of an aqueous composition.

Suitably, there is provided a well treatment fluid comprising:
(a) a phosphonium compound; and
(b) a polymeric friction reducer.

Suitably, the well treatment fluid comprises an aqueous fluid comprising:
(a) a phosphonium compound; and
(b) a polymeric friction reducer.

The well treatment fluid may comprise water and a non-aqueous solvent.

The well treatment fluid may comprise slick water (water with solvent).

The well treatment fluid may comprise propants.

The well treatment fluid may comprise a fluid prepared from fresh water. The well treatment fluid may be substantially free of sodium and calcium salts.

The well treatment fluid may comprise a fluid prepared from brine. The well treatment fluid may comprise a fluid prepared from sea water. The well treatment fluid may comprise sodium and/or calcium and/or potassium salts.

Suitably, the well treatment fluid comprises metal salts in an amount of less than 10% by weight. Suitably, the well treatment fluid comprises metal salts in an amount of less than 5% by weight.

Suitably, the well treatment fluid comprises sodium and/or calcium and/or potassium salts in a combined amount of less than 10% by weight. Suitably, the well treatment fluid comprises sodium and/or calcium and/or potassium salts in a combined amount of less than 5% by weight.

Suitably, the well treatment fluid comprises water in an amount of at least 80% by weight. Suitably, the well treatment fluid comprises water in an amount of at least 85% by weight. Suitably, the well treatment fluid comprises water in an amount of at least 90% by weight. Suitably, the well treatment fluid comprises water in an amount of at least 95% by weight.

The well treatment fluid may comprise a combination of polymeric friction reducers (b). Suitably, the well treatment fluid comprises a single polymeric friction reducer (b).

Suitably, the polymeric friction reducer (b) comprises a high molecular weight polymer. Suitably, the polymeric friction reducer (b) comprises a high molecular weight polymer having a number average molecular weight of from 12 million to 14 million. Suitably, the polymeric friction reducer (b) comprises a very high molecular weight polymer. Suitably, the polymeric friction reducer (b) comprises a very high molecular weight polymer having a number average molecular weight of at least 16 million.

Suitably, the polymeric friction reducer (b) comprises an emulsion polymer.

Suitably, the polymeric friction reducer comprises a charged polymer.

The polymeric friction reducer (b) may comprises a cationic polymer. Suitably, the polymeric friction reducer (b) comprises an anionic polymer.

Suitably, the polymeric friction reducer (b) is selected from the group consisting of polymers and/or copolymers of acrylamides, acrylates, isobutylene, ethylene oxide and guar gum and combinations thereof.

Suitably, the polymeric friction reducer (b) comprises a polyacrylamide.

Suitably, the polymeric friction reducer (b) comprises a polyacrylamide which comprises a copolymer of acrylamide and acrylic acid. Suitably, the polymeric friction reducer (b) comprises a polyacrylamide which consists of a copolymer of acrylamide and acrylic acid.

Suitably, the polymeric friction reducer (b) comprises a copolymer of acrylamide and acrylic acid. The polymeric friction reducer (b) may consist of a copolymer of acrylamide and acrylic acid.

The polymeric friction reducer (b) may comprise an acrylamide polymer. The polymeric friction reducer (b) may consist of an acrylamide polymer.

The polymeric friction reducer (b) may comprise a combination of an acrylamide polymer and an acrylamide and acrylic acid copolymer. The polymeric friction reducer (b) may consist of a combination of an acrylamide polymer and an acrylamide and acrylic acid copolymer.

Suitably, the well treatment fluid comprises a polymeric friction reducer (b) which comprises an anionic acrylamide/acrylic acid copolymer.

Suitably, the polymeric friction reducer (b) comprises a high molecular weight anionic polyacrylamide. Suitably, the polymeric friction reducer (b) comprises a very high molecular weight anionic polyacrylamide.

Suitably, the polymeric friction reducer (b) consists of a polyacrylamide. Suitably, the polymeric friction reducer (b) consist of a high molecular weight anionic polyacrylamide. Suitably, the polymeric friction reducer (b) consist of a very high molecular weight anionic polyacrylamide.

The well treatment fluid may comprise a combination of phosphonium compounds (a). Suitably, the well treatment fluid comprises a single phosphonium compound (a).

Suitably, the well treatment fluid comprises a phosphonium compound (a) having formula:

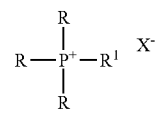

wherein each R is independently a $C_1$-$C_6$ alkyl group which is unsubstituted or substituted by a cyano, hydroxyl, esterified hydroxyl or aryl group;

$R^1$ represents a $C_8$-$C_{18}$ alkyl group which is substituted or unsubstituted; and X represents either chlorine or bromine.

Suitably, each R is a $C_1$-$C_6$ alkyl group. Suitably, each R is a $C_3$-$C_5$ alkyl group. Suitably each R is a butyl group.

Suitably $R^1$ represents a $C_8$-$C_{18}$ alkyl group. Suitably, R1 is a $C_{12}$-$C_{16}$ alkyl group. Suitably, $R^1$ is a tetradecyl group.

Suitably, X is chlorine.

Suitably, the well treatment fluid comprises a phosphonium compound (a) which is a phosphonium chloride.

Suitably, the phosphonium compound (a) comprises tri n-butyl n-tetradecyl phosphonium chloride (hereafter "TTPC"). Suitably, the phosphonium compound (a) consists of TTPC.

Suitably, the well treatment fluid comprises an aqueous composition containing the phosphonium compound (a). Suitably, the well treatment fluid comprises an aqueous composition of TTPC.

Suitably, there is provided a well treatment fluid comprising:
(a) TTPC; and
(b) a polymeric friction reducer.

Suitably, there is provided a well treatment fluid comprising:
(a) a phosphonium compound; and
(b) a polyacrylamide.

Suitably, there is provided a well treatment fluid comprising:
(a) TTPC; and
(b) a polyacrylamide.

Suitably, there is provided an aqueous well treatment fluid comprising:
(a) TTPC; and
(b) a polyacrylamide.

Suitably, there is provided an aqueous well treatment fluid comprising:
(a) TTPC; and
(b) an acrylamide and acrylic acid copolymer.

Suitably, the well treatment fluid comprises a polymeric ammonium compound and/or an amphoteric surfactant.

Suitably, the well treatment fluid comprises:
(a) a phosphonium compound;
(b) a polymeric friction reducer; and
(c) a polymeric ammonium compound;

Suitably, the well treatment fluid comprises one or more polymeric ammonium compounds (c). Suitably, the well treatment fluid comprises a single polymeric ammonium compound (c).

Suitably, the well treatment fluid comprises a polymeric ammonium compound (c) having formula:

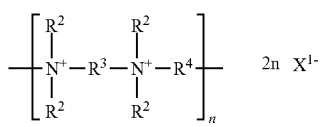

wherein each $R^2$ is independently a methyl group;
$R^3$ represents a $C_2$-$C_{12}$ alkyl group;
$R^4$ represents a $C_2$-$C_{12}$ alkyl group, a diethyl ether group, an isopropanol group or a N,N-dipropylurea group;
$X^1$ represents either chlorine or bromine; and
n is 2-40.

Suitably, each $R^2$ is independently a methyl group.

Suitably, $R^3$ represents a $C_2$-$C_{12}$ alkyl group which is substituted or unsubstituted, suitably unsubstituted. Suitably, $R^3$ represents a $C_2$-$C_{12}$ alkyl group. Suitably, $R^3$ is a $C_2$-$C_4$ alkyl group. Suitably, $R^3$ is a $C_2$ alkyl group.

Suitably, $R^4$ represents a $C_2$-$C_{12}$ alkyl group which is substituted or unsubstituted, suitably unsubstituted. Suitably, $R^4$ represents a $C_2$-$C_{12}$ alkyl group, a diethyl ether group, an isopropanol group or a N,N-dipropylurea group. Suitably, $R^4$ represents a diethyl ether group.

Suitably, $X^1$ is chlorine.

Suitably, n is 10-30. Suitably, n is 15-25. Suitably, n is 20.

Suitably, the well treatment fluid comprises Poly[oxyethylene(dimethylimino)ethylene(dimethylimino)ethylene dichloride] (also known as "polyquat").

Suitably, the polymeric ammonium compound (c) comprises Poly[oxyethylene(dimethylimino)ethylene(dimethylimino)ethylene dichloride].

Suitably, the polymeric ammonium compound (c) consists of Poly[oxyethylene(dimethylimino)ethylene(dimethylimino)ethylene dichloride].

Suitably, there is provided a well treatment fluid comprising:
(a) TTPC;
(b) a polymeric friction reducer; and
(c) a polymeric ammonium compound.

Suitably, there is provided a well treatment fluid comprising:
(a) a phosphonium compound;
(b) a polyacrylamide; and
(c) a polymeric ammonium compound.

Suitably, there is provided a well treatment fluid comprising:
(a) TTPC;
(b) a polyacrylamide; and
(c) a polymeric ammonium compound.

Suitably, there is provided a well treatment fluid comprising:
(a) TTPC;
(b) a polyacrylamide; and
(c) Poly[oxyethylene(dimethylimino)ethylene(dimethylimino)ethylene dichloride].

Suitably, there is provided an aqueous well treatment fluid comprising:
(a) TTPC;
(b) a polyacrylamide; and
(c) Poly[oxyethylene(dimethylimino)ethylene(dimethylimino)ethylene dichloride].

Suitably, there is provided an aqueous well treatment fluid comprising:
(a) TTPC;
(b) an acrylamide and acrylic acid copolymer; and
(c) Poly[oxyethylene(dimethylimino)ethylene(dimethylimino)ethylene dichloride].

Suitably, the well treatment fluid comprises:
(a) a phosphonium compound;
(b) a polymeric friction reducer;
(c) a polymeric ammonium compound; and
(d) an amphoteric surfactant.

Suitably, the well treatment fluid comprises one or more amphoteric surfactants (d). Suitably, the well treatment fluid comprises a single amphoteric surfactant (d).

Suitably, the amphoteric surfactant (d) is selected from the group consisting of alkyl ampho- or iminodicarboxylate amphoteric surfactants. Suitably, the amphoteric surfactant (d) is selected from the group consisting of alkyl iminodipropionate amphoteric surfactants.

Suitably, the amphoteric surfactant (d) comprises an alkyl iminodipropionate amphoteric surfactant.

Suitably, the amphoteric surfactant (d) comprises an alkyl iminodipropionate amphoteric surfactant wherein the alkyl group is selected from the group consisting of 2-ethylhexyl-, octyl-, decyloxypropyl-, dodecyl-, coco- or tallow.

Suitably, the amphoteric surfactant (d) consists of an alkyl iminodipropionate amphoteric surfactant.

Suitably, the amphoteric surfactant (d) consists of an alkyl iminodipropionate amphoteric surfactant wherein the alkyl group is selected from the group consisting of 2-ethylhexyl-, octyl-, decyloxypropyl-, dodecyl-, coco- or tallow.

Suitably, there is provided a well treatment fluid comprising:
(a) TTPC;
(b) a polymeric friction reducer;
(c) a polymeric ammonium compound; and
(d) an amphoteric surfactant.

Suitably, there is provided a well treatment fluid comprising:
(a) a phosphonium compound;
(b) a polyacrylamide;
(c) a polymeric ammonium compound; and
(d) an amphoteric surfactant.

Suitably, there is provided a well treatment fluid comprising:
(a) TTPC;
(b) a polyacrylamide;
(c) a polymeric ammonium compound; and
(d) an amphoteric surfactant.

Suitably, there is provided a well treatment fluid comprising:
(a) TTPC;
(b) a polyacrylamide; and
(c) Poly[oxyethylene(dimethylimino)ethylene(dimethylimino)ethylene dichloride]; and
(d) an amphoteric surfactant.

Suitably, there is provided a well treatment fluid comprising:
(a) TTPC;
(b) a polyacrylamide; and
(c) Poly[oxyethylene(dimethylimino)ethylene(dimethylimino)ethylene dichloride]; and
(d) an alkyl iminodipropionate amphoteric surfactant.

Suitably, there is provided an aqueous well treatment fluid comprising:
(a) TTPC;
(b) a polyacrylamide; and
(c) Poly[oxyethylene(dimethylimino)ethylene(dimethylimino)ethylene dichloride]; and
(d) an alkyl iminodipropionate amphoteric surfactant.

Suitably, there is provided an aqueous well treatment fluid comprising:

(a) TTPC;
(b) an acrylamide and acrylic acid copolymer; and
(c) Poly[oxyethylene(dimethylimino)ethylene(dimethylimino)ethylene dichloride]; and
(d) an alkyl iminodipropionate amphoteric surfactant.

Suitably, the well treatment fluid comprises water, a phosphonium compound and a polymeric friction reducer in a combined amount of at least 80% by weight of the composition. Suitably, the well treatment fluid comprises water, a phosphonium compound and a polymeric friction reducer in a combined amount of at least 90% by weight of the composition.

Suitably, the well treatment fluid comprises a phosphonium compound (a) in an amount of at least 1 ppm. Suitably, the well treatment fluid comprises a phosphonium compound (a) in an amount of at least 5 ppm. Suitably, the well treatment fluid comprises a phosphonium compound (a) in an amount of at least 10 ppm. The well treatment fluid may comprise a phosphonium compound (a) in an amount of at least 20 ppm. The well treatment fluid may comprise a phosphonium compound (a) in an amount of at least 30 ppm.

Suitably, the well treatment fluid comprises TTPC in an amount of at least 1 ppm. Suitably, the well treatment fluid comprises TTPC in an amount of at least 5 ppm. Suitably, the well treatment fluid comprises TTPC in an amount of at least 10 ppm. The well treatment fluid may comprise TTPC in an amount of at least 20 ppm. The well treatment fluid may comprise TTPC in an amount of at least 30 ppm.

Suitably, the well treatment fluid comprises a polymeric friction reducer (b) in an amount of at least 1 ppm. The well treatment fluid may comprise a polymeric friction reducer (b) in an amount of at least 10 ppm.

Suitably, the well treatment fluid comprises a polymeric friction reducer composition comprising water and polymeric friction reducer and wherein the well treatment fluid comprises said polymeric friction reducer composition in an amount of at least 10 ppm, for example at least 100 ppm. Suitably, the well treatment fluid comprises a polymeric friction reducer composition comprising water and polymeric friction reducer and wherein the well treatment fluid comprises said polymeric friction reducer composition in an amount of at least 500 ppm, for example at least 1000 ppm.

Suitably, the well treatment fluid comprises a polyacrylamide in an amount of at least 1 ppm. The well treatment fluid may comprise a polyacrylamide in an amount of at least 10 ppm.

Suitably, the well treatment fluid comprises a polymeric friction reducer composition comprising water and polyacrylamide and wherein the well treatment fluid comprises said polymeric friction reducer composition in an amount of at least 10 ppm, for example at least 100 ppm. Suitably, the well treatment fluid comprises a polymeric friction reducer composition comprising water and polyacrylamide and wherein the well treatment fluid comprises said polymeric friction reducer composition in an amount of at least 500 ppm, for example at least 1000 ppm.

Suitably, the well treatment fluid comprises a high molecular weight or very high molecular weight anionic polyacrylamide in an amount of at least 1 ppm. The well treatment fluid may comprise a high molecular weight or very high molecular weight anionic polyacrylamide in an amount of at least 10 ppm.

Suitably, the well treatment fluid comprises a high molecular weight or very high molecular weight anionic acrylamide and acrylic acid copolymer in an amount of at least 1 ppm.

The well treatment fluid may comprise a high molecular weight or very high molecular weight acrylamide and acrylic acid copolymer in an amount of at least 10 ppm.

Suitably, the well treatment fluid comprises a polymeric friction reducer composition comprising water and a high molecular weight or very high molecular weight anionic polyacrylamide and wherein the well treatment fluid comprises said polymeric friction reducer composition in an amount of at least 10 ppm, for example at least 100 ppm. Suitably, the well treatment fluid comprises a polymeric friction reducer composition comprising water and a high molecular weight or very high molecular weight anionic polyacrylamide and wherein the well treatment fluid comprises said polymeric friction reducer composition in an amount of at least 500 ppm, for example at least 1000 ppm.

Suitably, the well treatment fluid comprises a polymeric ammonium compound (c) in an amount of at least 1 ppm. The well treatment fluid may comprise polymeric ammonium compound (c) in an amount of at least 10 ppm.

Suitably, the well treatment fluid may comprise Poly[oxyethylene(dimethylimino)ethylene(dimethylimino)ethylene dichloride] in an amount of at least 1 ppm. The well treatment fluid may comprise Poly[oxyethylene(dimethylimino)ethylene(dimethylimino)ethylene dichloride] in an amount of at least 10 ppm.

Suitably, the well treatment fluid comprises an amphoteric surfactant (d) in an amount of at least 1 ppm. The well treatment fluid may comprise an amphoteric surfactant (d) in an amount of at least 10 ppm.

Suitably, the well treatment fluid comprises an alkyl iminodipropionate amphoteric surfactant in an amount of at least 1 ppm. The well treatment fluid may comprise an alkyl iminodipropionate amphoteric surfactant in an amount of at least 10 ppm.

Suitably, the well treatment fluid is manufactured in the field. Suitably, a phosphonium compound (a) is added to an aqueous fluid to manufacture a well treatment fluid shortly before said well treatment fluid is pumped into a well bore. Suitably, a phosphonium compound (a) and a polymeric friction reducer (b) are added to an aqueous fluid to manufacture a well treatment fluid shortly before said well treatment fluid is pumped into a well bore.

The well treatment fluid may comprise a friction reducing composition according to the first aspect.

The well treatment fluid may comprise a synergistic mixture of phosphonium compound (a) and polymeric friction reducer (b). Suitably, by "synergistic mixture" it is meant that the mixture of (a) and (b) has a synergistic effect on friction reduction.

Surprisingly, it has been found that when phosphonium compound (a) and polymeric friction reducer (b) are used in combination in a well treatment fluid the resulting fluid may exhibit a greater reduction in friction than a well treatment fluid using (b) alone.

According to a third aspect of the present invention there is provided a method of modifying a well treatment fluid, wherein the method comprises adding a phosphonium compound to a well treatment fluid.

The method may comprise a method of modifying an aqueous well treatment fluid.

Suitably, there is provided a method of modifying a well treatment fluid to provide said well treatment fluid with reduced friction, in use, wherein the method comprises adding a phosphonium compound to said well treatment fluid.

The method may comprise adding an aqueous composition comprising a phosphonium compound to the well treatment fluid.

The method may comprise adding a polymeric friction reducer to a well treatment fluid. The method may comprise adding an aqueous composition comprising a polymeric friction reducer to the well treatment fluid.

The method may comprise adding a friction reducing composition according to the first aspect to a well treatment fluid.

The method may comprise adding a phosphonium compound to a well treatment fluid which comprises a polymeric friction reducer.

Suitably, the method comprises modifying a well treatment fluid to provide a well treatment fluid according to the second aspect.

Suitably, the method comprises a method of modifying a well treatment fluid to reduce friction when said well treatment fluid is pumped into a well bore hole in use.

Suitably, the method comprises providing a well treatment fluid comprising:
(a) a phosphonium compound; and
(b) a polymeric friction reducer.

Suitably, the method comprises providing an aqueous well treatment fluid comprising:
(a) a phosphonium compound; and
(b) a polymeric friction reducer.

The well treatment fluid may comprise water and a non-aqueous solvent.

The well treatment fluid may comprise slick water (water with solvent).

The well treatment fluid may comprise propants.

The well treatment fluid may comprise a fluid prepared from fresh water. The well treatment fluid may be substantially free of sodium and calcium salts.

The well treatment fluid may comprise a fluid prepared from brine. The well treatment fluid may comprise a fluid prepared from sea water. The well treatment fluid may comprise sodium and/or calcium and/or potassium salts.

Suitably, the well treatment fluid comprises metal salts in an amount of less than 10% by weight. Suitably, the well treatment fluid comprises metal salts in an amount of less than 5% by weight.

Suitably, the well treatment fluid comprises sodium and/or calcium and/or potassium salts in a combined amount of less than 10% by weight. Suitably, the well treatment fluid comprises sodium and/or calcium and/or potassium salts in a combined amount of less than 5% by weight.

Suitably, the well treatment fluid comprises water in an amount of at least 80% by weight. Suitably, the well treatment fluid comprises water in an amount of at least 85% by weight. Suitably, the well treatment fluid comprises water in an amount of at least 90% by weight. Suitably, the well treatment fluid comprises water in an amount of at least 95% by weight.

Suitably, the method comprises adding a phosphonium compound (a) in an amount of at least 1 ppm. Suitably, the method comprises adding a phosphonium compound (a) in an amount of at least 5 ppm. Suitably, the method comprises adding a phosphonium compound (a) in an amount of at least 10 ppm. The method may comprise adding a phosphonium compound (a) in an amount of at least 20 ppm. The method may comprise adding a phosphonium compound (a) in an amount of at least 30 ppm.

Suitably, the method comprises adding an aqueous composition comprising a phosphonium compound (a).

Suitably, the method comprises adding TTPC in an amount of at least 1 ppm. Suitably, the method comprises adding TTPC in an amount of at least 5 ppm. Suitably, the method comprises adding TTPC in an amount of at least 10 ppm. The method may comprise adding TTPC in an amount of at least 20 ppm. The method may comprise adding TTPC in an amount of at least 30 ppm.

Suitably, the method comprises adding an aqueous composition comprising TTPC.

Suitably, the method comprises adding a polymeric friction reducer (b) in an amount of at least 1 ppm. The method may comprise adding a polymeric friction reducer (b) in an amount of at least 10 ppm.

Suitably, the method comprises adding a polymeric friction reducer composition comprising water and polymeric friction reducer and wherein the well treatment fluid comprises said polymeric friction reducer composition in an amount of at least 10 ppm, for example at least 100 ppm. Suitably, the method comprises adding a polymeric friction reducer composition comprising water and polymeric friction reducer and wherein the well treatment fluid comprises said polymeric friction reducer composition in an amount of at least 500 ppm, for example at least 1000 ppm.

Suitably, the method comprises adding a polyacrylamide in an amount of at least 1 ppm. The method may comprise adding a polyacrylamide in an amount of at least 10 ppm.

Suitably, the method comprises adding a polymeric friction reducer composition comprising water and polyacrylamide and wherein the well treatment fluid comprises said polymeric friction reducer composition in an amount of at least 10 ppm, for example at least 100 ppm. Suitably, the method comprises adding a polymeric friction reducer composition comprising water and polyacrylamide and wherein the well treatment fluid comprises said polymeric friction reducer composition in an amount of at least 500 ppm, for example at least 1000 ppm.

Suitably, the method comprises adding a high molecular weight or very high molecular weight anionic polyacrylamide in an amount of at least 1 ppm. The method may comprise adding a high molecular weight or very high molecular weight anionic polyacrylamide in an amount of at least 10 ppm.

Suitably, the method comprises adding a high molecular weight or very high molecular weight anionic acrylamide and acrylic acid copolymer in an amount of at least 1 ppm. The method may comprise adding a high molecular weight or very high molecular weight anionic acrylamide and acrylic acid copolymer in an amount of at least 10 ppm.

Suitably, the method comprises adding a polymeric friction reducer composition comprising water and a high molecular weight or very high molecular weight anionic polyacrylamide and wherein the well treatment fluid comprises said polymeric friction reducer composition in an amount of at least 10 ppm, for example at least 100 ppm. Suitably, the method comprises adding a polymeric friction reducer composition comprising water and a high molecular weight or very high molecular weight anionic polyacrylamide and wherein the well treatment fluid comprises said polymeric friction reducer composition in an amount of at least 500 ppm, for example at least 1000 ppm.

Suitably, the method comprises adding a polymeric ammonium compound (c) in an amount of at least 1 ppm. The method may comprise adding a polymeric ammonium compound (c) in an amount of at least 10 ppm.

Suitably, the method comprises adding Poly[oxyethylene(dimethylimino)ethylene(dimethylimino)ethylene dichloride] in an amount of at least 1 ppm. The method may comprise adding Poly[oxyethylene(dimethylimino)ethylene(dimethylimino)ethylene dichloride] in an amount of at least 10 ppm.

Suitably, the method comprises adding an amphoteric surfactant (d) in an amount of at least 1 ppm. The method may comprise adding an amphoteric surfactant (d) in an amount of at least 10 ppm.

Suitably, the method comprises adding an alkyl iminodipropionate amphoteric surfactant in an amount of at least 1 ppm. The method may comprises adding an alkyl iminodipropionate amphoteric surfactant in an amount of at least 10 ppm.

Suitably, there is provided a method of providing a well treatment fluid comprising:
(a) TTPC; and
(b) a polymeric friction reducer.

Suitably, there is provided a method of providing a well treatment fluid comprising:
(a) TTPC; and
(b) a polyacrylamide.

Suitably, there is provided a method of providing a well treatment fluid comprising:
(a) TTPC; and
(b) an acrylamide and acrylic acid copolymer.

Suitably, there is provided a method of providing a well treatment fluid comprising:
(a) a phosphonium compound;
(b) a polymeric friction reducer; and
(c) a polymeric ammonium compound;

Suitably, there is provided a method of providing a well treatment fluid comprising:
(a) TTPC;
(b) a polyacrylamide; and
(c) Poly[oxyethylene(dimethylimino)ethylene(dimethylimino)ethylene dichloride].

Suitably, there is provided a method of providing a well treatment fluid comprising:
(a) TTPC;
(b) an acrylamide and acrylic acid copolymer; and
(c) Poly[oxyethylene(dimethylimino)ethylene(dimethylimino)ethYlene dichloride].

Suitably, there is provided a method of providing a well treatment fluid comprising:
(a) a phosphonium compound;
(b) a polymeric friction reducer;
(c) a polymeric ammonium compound; and
(d) an amphoteric surfactant.

Suitably, there is provided a method of providing a well treatment fluid comprising:
(a) TTPC;
(b) a polyacrylamide; and
(c) Poly[oxyethylene(dimethylimino)ethylene(dimethylimino)ethylene dichloride]; and
(d) an amphoteric surfactant.

Suitably, there is provided a method of providing a well treatment fluid comprising:
(a) TTPC;
(b) an acrylamide and acrylic acid copolymer; and
(c) Poly[oxyethylene(dimethylimino)ethylene(dimethylimino)ethylene dichloride]; and
(d) an alkyl iminodipropionate amphoteric surfactant.

According to a fourth aspect of the present invention there is provided a method of fracturing a geological formation and/or extracting oil and/or gas from a geological formation, wherein the method uses a well treatment fluid comprising a phosphonium compound.

Suitably, the method comprises pumping a well treatment fluid. Suitably, the method comprises pumping a well treatment fluid into a well bore hole. Suitably, the method comprises pumping a well treatment fluid to create or expand fractures in a geological formation. Suitably, the method comprises pumping a well treatment fluid in a process to extract oil and/or gas.

Suitably, there is provided a method of fracturing a geological formation, wherein the method comprises using a well treatment fluid comprising a phosphonium compound to reduce friction.

Suitably, there is provided a method of extracting oil and/or gas from a geological formation, wherein the method comprises using a well treatment fluid comprising a phosphonium compound to reduce friction.

Suitably, the method comprises using a well treatment fluid comprising a phosphonium compound and a polymeric friction reducer.

Suitably, the method comprises adding a phosphonium compound to a well treatment fluid.

Suitably, the method comprises adding a polymeric friction reducer to a well treatment fluid.

Suitably, the method comprises adding a friction reducing composition according to the first aspect to a well treatment fluid.

Suitably, the method comprises using a well treatment fluid according to the second aspect.

Suitably, the method comprises a method of reducing friction when a well treatment fluid is pumped into a well bore hole.

Suitably, the method comprises using a well treatment fluid comprising:
(a) TTPC; and
(b) a polymeric friction reducer.

Suitably, the method comprises using a well treatment fluid comprising:
(a) TTPC; and
(b) a polyacrylamide.

Suitably, the method comprises using a well treatment fluid comprising:
(a) TTPC; and
(b) an acrylamide and acrylic acid copolymer.

Suitably, the method comprises using a well treatment fluid comprising:
(a) a phosphonium compound;
(b) a polymeric friction reducer; and
(c) a polymeric ammonium compound;

Suitably, the method comprises using a well treatment fluid comprising:
(a) TTPC;
(b) a polyacrylamide; and
(c) Poly[oxyethylene(dimethylimino)ethylene(dimethylimino)ethylene dichloride].

Suitably, the method comprises using a well treatment fluid comprising:
(a) TTPC;
(b) an acrylamide and acrylic acid copolymer; and
(c) Poly[oxyethylene(dimethylimino)ethylene(dimethylimino)ethylene dichloride].

Suitably, the method comprises using a well treatment fluid comprising:
(a) a phosphonium compound;
(b) a polymeric friction reducer;
(c) a polymeric ammonium compound; and
(d) an amphoteric surfactant.

Suitably, the method comprises using a well treatment fluid comprising:

(a) TTPC;
(b) a polyacrylamide; and
(c) Poly[oxyethylene(dimethylimino)ethylene(dimethylimino)ethylene dichloride]; and
(d) an amphoteric surfactant.

Suitably, the method comprises using a well treatment fluid comprising:
(a) TTPC;
(b) an acrylamide and acrylic acid copolymer; and
(c) Poly[oxyethylene(dimethylimino)ethylene(dimethylimino)ethylene dichloride]; and
(d) an alkyl iminodipropionate amphoteric surfactant.

According to a fifth aspect of the present invention there is provided the use of a phosphonium compound for the purpose of reducing friction when a well treatment fluid is pumped.

Suitably, there is provided the use of a phosphonium compound for the purpose of reducing friction when a well treatment fluid is pumped, wherein the use comprises providing a well treatment fluid comprising a phosphonium compound.

Suitably, there is provided the use of a phosphonium compound for the purpose of reducing friction when a well treatment fluid is pumped into a well bore hole, wherein the use comprises providing a well treatment fluid comprising a phosphonium compound.

Suitably, there is provided the use of a phosphonium compound for the purpose of reducing friction when a well treatment fluid is pumped into a well bore hole, wherein the use comprises adding a phosphonium compound to a well treatment fluid.

Suitably, the use comprises adding a phosphonium compound to a well treatment fluid before said well treatment fluid is pumped into a well bore hole.

Suitably, the use comprises adding a phosphonium compound to a well treatment fluid before said well treatment fluid is pumped through pipework to a well bore hole.

Suitably, the use comprises providing a well treatment fluid comprising a phosphonium compound and other additives. Suitably, the use comprises adding a phosphonium compound to a well treatment fluid comprising other additives. Suitably, the use comprises adding a phosphonium compound and other additives to a well treatment fluid.

Suitably, the use comprises providing a well treatment fluid comprising a phosphonium compound and a polymeric friction reducer. Suitably, the use comprises adding a polymeric friction reducer to a well treatment fluid. The use may comprise adding a phosphonium compound to a well treatment fluid prior to the addition of a polymeric friction reducer to said well treatment fluid. The use may comprise adding a phosphonium compound to a well treatment fluid subsequent to the addition of a polymeric friction reducer to said well treatment fluid.

Suitably, the use comprises adding a phosphonium compound to a well treatment fluid comprising a polymeric friction reducer.

Suitably, the use comprises adding a phosphonium compound and a polymeric friction reducer to a well treatment fluid.

Suitably, there is provided the use of a phosphonium compound for the purpose of reducing friction when a well treatment fluid is pumped, wherein the use comprises providing a well treatment fluid comprising a phosphonium compound and a polymeric friction reducer.

Suitably, there is provided the use of a phosphonium compound in combination with a polymeric friction reducer for the purpose of reducing friction when a well treatment fluid is pumped, wherein the use comprises providing a well treatment fluid comprising a phosphonium compound and a polymeric friction reducer.

Suitably, the use comprises manufacturing a well treatment fluid in the field. Suitably, the use comprises adding a phosphonium compound (a) to an aqueous fluid to manufacture a well treatment fluid shortly before said well treatment fluid is pumped into a well bore. Suitably, the use comprises adding a phosphonium compound (a) and a polymeric friction reducer (b) to an aqueous fluid to manufacture a well treatment fluid shortly before said well treatment fluid is pumped into a well bore.

Suitably, the use comprises adding a phosphonium compound and a polymeric ammonium compound to a well treatment fluid.

Suitably, the use comprises adding a phosphonium compound, a polymeric friction reducer, and a polymeric ammonium compound to a well treatment fluid.

Suitably, the use comprises adding a phosphonium compound and an amphoteric surfactant to a well treatment fluid.

Suitably, the use comprises adding a phosphonium compound, a polymeric friction reducer, and a polymeric ammonium compound and an amphoteric surfactant to a well treatment fluid.

Suitably, the use comprises adding a friction reducing composition according to the first aspect to a well treatment fluid.

Suitably, the use comprises providing a well treatment fluid according to the second aspect.

Suitably, the use comprises providing a well treatment fluid comprising:
(a) TTPC; and
(b) a polymeric friction reducer.

Suitably, the use comprises providing a well treatment fluid comprising:
(a) TTPC; and
(b) a polyacrylamide.

Suitably, the use comprises providing a well treatment fluid comprising:
(a) TTPC; and
(b) an acrylamide and acrylic acid copolymer.

Suitably, the use comprises providing a well treatment fluid comprising:
(a) a phosphonium compound;
(b) a polymeric friction reducer; and
(c) a polymeric ammonium compound.

Suitably, the use comprises providing a well treatment fluid comprising:
(a) TTPC;
(b) a polyacrylamide; and
(c) Poly[oxyethylene(dimethylimino)ethylene(dimethylimino)ethylene dichloride].

Suitably, the use comprises providing a well treatment fluid comprising:
(a) TTPC;
(b) an acrylamide and acrylic acid copolymer; and
(c) Poly[oxyethylene(dimethylimino)ethylene(dimethylimino)ethylene dichloride].

Suitably, the use comprises providing a well treatment fluid comprising:
(a) a phosphonium compound;
(b) a polymeric friction reducer;
(c) a polymeric ammonium compound; and
(d) an amphoteric surfactant.

Suitably, the use comprises providing a well treatment fluid comprising:

(a) TTPC;
(b) a polyacrylamide; and
(c) Poly[oxyethylene(dimethylimino)ethylene(dimethylimino)ethylene dichloride]; and
(d) an amphoteric surfactant.

Suitably, the use comprises providing a well treatment fluid comprising:
(a) TTPC;
(b) an acrylamide and acrylic acid copolymer; and
(c) Poly[oxyethylene(dimethylimino)ethylene(dimethylimino)ethylene dichloride]; and
(d) an alkyl iminodipropionate amphoteric surfactant.

BRIEF DESCRIPTION OF DRAWINGS

The present invention will now be illustrated by way of example with reference to the accompanying drawings in which:

FIG. 1 shows a graph illustrating friction reduction in an example well fluid.

DETAILED DESCRIPTION OF PREFERRED EMBODIMENTS

Well treatment fluids comprising a friction reducing composition were prepared and tested in an apparatus adapted to determine friction reduction.

Test Apparatus

The apparatus comprised a 20 gallon holding vessel and a test section comprising a loop of half inch pipe having a length of 5 feet. The apparatus comprised a 2 horse power centrifugal pump to circulate fluid via the test section. The apparatus comprised a transmitter to measure differential pressure across the test section. The apparatus further comprised a data logger to record flowrate, temperature and pressure drop across the test section.

Well Treatment Fluid Preparation

Well treatment fluids were prepared within the apparatus. The holding vessel was filled with fresh water or brine as detailed in the examples which follow.

A phosphonium compound (a) was added to the water. In some examples a polymeric ammonium compound (c) or a polymeric ammonium compound (c) and an amphoteric surfactant (d) were also added together with the phosphonium compound (a).

Following the addition of the phosphonium compound (a) the fluid was mixed by being passed through the test loop for 60 seconds.

The friction test procedure was then commenced and a polymeric friction reducer (b) was added to the fluid to form the well treatment fluid during the test procedure.

Friction Test Procedure 9 gallons of fluid was circulated at 21.1 GPM (gallons per minute) (Reynolds number=170,000) and a baseline was run for 2 minutes.

After 2 minutes of circulation the polymeric friction reducer (b) was added to the fluid and the fluid was recirculated for a further 10 minutes.

The data collected by the apparatus and the fluid physical properties were used to compile test results. The differential pressure (pressure drop) across the test section versus flow rate was measured. The friction reduction was calculated using the equation:

(Differential pressure/Flow corrected base differential pressure)×100=% Friction reduction.

The % Friction reduction was calculated as a maximum value and also as a value after 5 minutes and 10 minutes of circulation.

EXAMPLES

Example 1

Brine solution well treatment fluids were prepared and tested.

Well treatment fluids were prepared by adding a phosphonium compound (a) and a polymeric friction reducer (b) to brine solution as detailed in Table 1.

In each case 20 gallons of a brine solution comprising water and 3% potassium chloride plus 500 mg $L^{-1}$ calcium chloride were prepared.

The phosphonium compound (a) comprised TTPC. Bellacide 355, an aqueous composition comprising 5% TTPC available from BWA Water Additives was added to provide fluids comprising TTPC in the stated ppm.

The polymeric friction reducer (b) comprised a high molecular weight anionic polyacrylamide friction reducer. KemFlow A-4251 available from Kemira was added to provide fluids comprising a friction reducer composition in the stated ppm calculated on a product (rather than active) basis.

The fluids were tested according to the friction test method and the results are detailed in Table 1.

TABLE 1

| TTPC Concentration (ppm active) | Concentration of polymeric friction reducer composition (ppm product) | pH | Percent Friction Reduction | | |
|---|---|---|---|---|---|
| | | | Max | 5 min. | 10 min. |
| 0 (control) | 500 | 7.51 | 57.01 | 40.90 | 35.30 |
| 20 | 500 | 7.53 | 56.82 | 41.54 | 36.04 |
| 30 | 500 | 7.50 | 56.94 | 42.76 | 36.66 |

As can be seen, well treatment fluids comprising TTPC in an amount of 20 ppm active or greater maintained a higher percent friction reduction over time compared to the control.

FIG. 1 illustrates the temperature (1), flow rate (2), % friction reduction (3) and differential pressure (4) relative to the elapsed time during the testing of the well treatment fluid of Example 1 comprising 20 ppm active TTPC.

Example 2

Brine solution well treatment fluids were prepared and tested.

Well treatment fluids were prepared by adding a phosphonium compound (a) and a polymeric friction reducer (b) to brine solution as detailed in Table 2.

In each case 20 gallons of a brine solution comprising water and 3% potassium chloride plus 500 mg $L^{-1}$ calcium chloride brine solution were prepared.

The phosphonium compound (a) comprised TTPC. Bellacide 355, an aqueous composition comprising 5% TTPC available from BWA Water Additives was added to provide fluids comprising TTPC in the stated ppm.

The polymeric friction reducer (b) comprised a very high molecular weight anionic polyacrylamide friction reducer. KemFlow A-4451 available from Kemira was added to provide fluids comprising a friction reducer composition in the stated ppm calculated on a product (rather than active) basis.

The fluids were tested according to the friction test method and the results are detailed in Table 2.

TABLE 2

| TTPC Concentration (ppm active) | Concentration of polymeric friction reducer composition (ppm product) | pH | Percent Friction Reduction | | |
|---|---|---|---|---|---|
| | | | Max | 5 min. | 10 min. |
| 0 (control) | 500 | 7.62 | 56.35 | 36.05 | 34.32 |
| 0 (control) | 1000 | 7.55 | 56.74 | 45.86 | 40.64 |
| 10 | 500 | 7.52 | 56.15 | 39.43 | 36.35 |
| 20 | 500 | 7.56 | 57.31 | 45.53 | 38.20 |
| 30 | 500 | 7.50 | 56.59 | 46.58 | 40.39 |
| 10 | 1000 | 7.40 | 56.12 | 46.05 | 41.54 |
| 20 | 1000 | 7.38 | 56.24 | 47.80 | 43.32 |
| 30 | 1000 | 7.38 | 57.23 | 51.26 | 48.52 |

As can be seen, well treatment fluids comprising TTPC in an amount of 10 ppm active or greater maintained a higher percent friction reduction over time compared to the control.

Example 3

Fresh water well treatment fluids were prepared and tested.

Well treatment fluids were prepared by adding a phosphonium compound (a), a polymeric ammonium compound (c) and a polymeric friction reducer (b) to fresh water as detailed in Table 3.

The phosphonium compound (a) comprised TTPC and the polymeric ammonium compound (c) comprised Poly[oxyethylene(dimethylimino)ethylene(dimethylimino)ethylene dichloride] (also known as PQ). Bellacide 300, an aqueous composition comprising 2.8% TTPC and 2.2% Poly[oxyethylene(dimethylimino)ethylene(dimethylimino)ethylene dichloride] available from BWA Water Additives was added to provide fluids comprising TTPC and Poly[oxyethylene(dimethylimino)ethylene(dimethylimino)ethylene dichloride] in the stated combined ppm.

The polymeric friction reducer (b) comprised a high molecular weight anionic polyacrylamide friction reducer. KemFlow A-4251 available from Kemira was added to provide fluids comprising a friction reducer composition in the stated ppm calculated on a product (rather than active) basis.

The fluids were tested according to the friction test method and the results are detailed in Table 3.

TABLE 3

| TTPC & PQ Concentration (ppm active) | Concentration of polymeric friction reducer composition (ppm product) | pH | Percent Friction Reduction | | |
|---|---|---|---|---|---|
| | | | Max | 5 min. | 10 min. |
| 0 (control) | 500 | 6.30 | 51.48 | 48.45 | 44.01 |
| 0 (control) | 1000 | 6.34 | 55.42 | 54.06 | 52.12 |
| 10 | 500 | 6.15 | 52.34 | 48.54 | 44.52 |
| 20 | 500 | 6.10 | 53.97 | 49.05 | 45.65 |
| 30 | 500 | 6.05 | 54.04 | 49.06 | 45.60 |
| 10 | 1000 | 6.16 | 55.88 | 54.78 | 52.60 |
| 20 | 1000 | 6.21 | 56.39 | 54.58 | 53.25 |
| 30 | 1000 | 6.17 | 56.47 | 54.94 | 53.41 |

As can be seen, well treatment fluids comprising TTPC and PQ in an amount of 10 ppm active or greater maintained a higher percent friction reduction over time compared to the control.

Example 4

Fresh water well treatment fluids were prepared and tested.

Well treatment fluids were prepared by adding a phosphonium compound (a), a polymeric ammonium compound (c) and a polymeric friction reducer (b) to fresh water as detailed in Table 4.

The phosphonium compound (a) comprised TTPC and the polymeric ammonium compound (c) comprised Poly[oxyethylene(dimethylimino)ethylene(dimethylimino)ethylene dichloride] (also known as PQ). Bellacide 300, an aqueous composition comprising 2.8% TTPC and 2.2% Poly[oxyethylene(dimethylimino)ethylene(dimethylimino)ethylene dichloride] available from BWA Water Additives was added to provide fluids comprising TTPC and Poly[oxyethylene(dimethylimino)ethylene(dimethylimino)ethylene dichloride] in the stated combined ppm.

The polymeric friction reducer (b) comprised a very high molecular weight anionic polyacrylamide friction reducer. KemFlow A-4451 available from Kemira was added to provide fluids comprising a friction reducer composition in the stated ppm calculated on a product (rather than active) basis.

The fluids were tested according to the friction test method and the results are detailed in Table 4.

TABLE 4

| TTPC & PQ Concentration (ppm active) | Concentration of polymeric friction reducer composition (ppm product) | pH | Percent Friction Reduction | | |
|---|---|---|---|---|---|
| | | | Max | 5 min. | 10 min. |
| 0 (control) | 1000 | 6.13 | 55.91 | 54.69 | 53.78 |
| 10 | 1000 | 6.37 | 57.41 | 57.11 | 55.73 |
| 20 | 1000 | 6.35 | 57.21 | 56.22 | 54.27 |
| 30 | 1000 | 6.33 | 57.99 | 56.85 | 54.60 |

As can be seen, well treatment fluids comprising TTPC and PQ in an amount of 10 ppm active or greater maintained a higher percent friction reduction over time compared to the control.

Example 5

Brine solution well treatment fluids were prepared and tested.

Well treatment fluids were prepared by adding a phosphonium compound (a), a polymeric ammonium compound (c) and a polymeric friction reducer (b) to brine solution as detailed in Table 5.

In each case 20 gallons of a brine solution comprising water and 3% potassium chloride plus 500 mg L$^{-1}$ calcium chloride brine solution were prepared.

The phosphonium compound (a) comprised TTPC and the polymeric ammonium compound (c) comprised Poly[oxyethylene(dimethylimino)ethylene(dimethylimino)ethylene dichloride] (also known as PQ). Bellacide 300, an aqueous composition comprising 2.8% TTPC and 2.2% Poly[oxyethylene(dimethylimino)ethylene(dimethylimino)ethylene dichloride] available from BWA Water Additives was added to provide fluids comprising TTPC and Poly[oxyethylene(dimethylimino)ethylene(dimethylimino)ethylene dichloride] in the stated combined ppm.

The polymeric friction reducer (b) comprised a very high molecular weight anionic polyacrylamide friction reducer. KemFlow A-4451 available from Kemira was added to provide fluids comprising a friction reducer composition in the stated ppm calculated on a product (rather than active) basis.

The fluids were tested according to the friction test method and the results are detailed in Table 5.

TABLE 5

| TTPC & PQ Concentration | Concentration of polymeric friction reducer composition | Percent Friction Reduction | | |
|---|---|---|---|---|
| (ppm active) | (ppm product) | pH | Max | 5 min. | 10 min. |
| 0 (control) | 1000 | 7.62 | 56.74 | 45.86 | 40.64 |
| 10 | 1000 | 7.54 | 57.02 | 47.05 | 42.35 |
| 30 | 1000 | 7.52 | 57.62 | 46.69 | 42.35 |

As can be seen, well treatment fluids comprising TTPC and PQ maintained a higher percentage friction reduction over time compared to the control.

Example 6

Fresh water well treatment fluids were prepared and tested.

Well treatment fluids were prepared by adding a phosphonium compound (a), a polymeric ammonium compound (c), an amphoteric surfactant (d) and a polymeric friction reducer (b) to fresh water as detailed in Table 6.

The phosphonium compound (a) comprised TTPC, the polymeric ammonium compound (c) comprised Poly[oxyethylene(dimethylimino)ethylene(dimethylimino)ethylene dichloride] (also known as PQ) and the amphoteric surfactant (d) comprised an alkyl iminodipropionate amphoteric surfactant.

Bellacide 303, an aqueous composition comprising 15% TTPC and 12% Poly[oxyethylene(dimethylimino)ethylene(dimethylimino)ethylene dichloride] and 9.8% alkyl iminodipropionate amphoteric surfactant available from BWA Water Additives was added to provide fluids comprising TTPC and Poly[oxyethylene(dimethylimino)ethylene(dimethylimino)ethylene dichloride] and amphoteric surfactant in the stated combined ppm.

The polymeric friction reducer (b) comprised a high molecular weight anionic polyacrylamide friction reducer. KemFlow A-4251 available from Kemira was added to provide fluids comprising a friction reducer composition in the stated ppm calculated on a product (rather than active) basis.

The fluids were tested according to the friction test method and the results are detailed in Table 6.

TABLE 6

| TTPC & PQ & Amphoteric Concentration | Concentration of polymeric friction reducer composition | Percent Friction Reduction | | |
|---|---|---|---|---|
| (ppm active) | (ppm product) | pH | Max | 5 min. | 10 min. |
| 0 | 1000 | 6.34 | 55.42 | 54.06 | 52.12 |
| 13.6 | 1000 | 6.20 | 55.78 | 54.67 | 52.94 |
| 27.2 | 1000 | 6.09 | 55.68 | 54.41 | 53.58 |
| 40.8 | 1000 | 6.04 | 56.75 | 55.21 | 53.52 |

As can be seen, well treatment fluids comprising TTPC and PQ and amphoteric surfactant maintained a higher percent friction reduction over time compared to the control.

Example 7

Brine solution well treatment fluids were prepared and tested.

Well treatment fluids were prepared by adding a phosphonium compound (a), a polymeric ammonium compound (c), an amphoteric surfactant (d) and a polymeric friction reducer (b) to brine solution as detailed in Table 7.

In each case 20 gallons of a brine solution comprising water and 3% potassium chloride plus 500 mg $L^{-1}$ calcium chloride brine solution were prepared.

The phosphonium compound (a) comprised TTPC, the polymeric ammonium compound (c) comprised Poly[oxyethylene(dimethylimino)ethylene(dimethylimino)ethylene dichloride] (also known as PQ) and the amphoteric surfactant (d) comprised an alkyl iminodipropionate amphoteric surfactant.

Bellacide 303, an aqueous composition comprising 15% TTPC and 12% Poly[oxyethylene(dimethylimino)ethylene(dimethylimino)ethylene dichloride] and 9.8% alkyl iminodipropionate amphoteric surfactant available from BWA Water Additives was added to provide fluids comprising TTPC and Poly[oxyethylene(dimethylimino)ethylene(dimethylimino)ethylene dichloride] and amphoteric surfactant in the stated combined ppm.

The polymeric friction reducer (b) comprised a very high molecular weight anionic polyacrylamide friction reducer. KemFlow A-4451 available from Kemira was added to provide fluids comprising a friction reducer composition in the stated ppm calculated on a product (rather than active) basis.

The fluids were tested according to the friction test method and the results are detailed in Table 7.

TABLE 7

| TTPC & PQ & Amphoteric Concentration | Concentration of polymeric friction reducer composition | Percent Friction Reduction | | |
|---|---|---|---|---|
| (ppm active) | (ppm product) | pH | Max | 5 min. | 10 min. |
| 0 | 500 | 7.62 | 56.35 | 36.05 | 34.32 |
| 0 | 1000 | 7.55 | 56.74 | 45.86 | 40.64 |
| 40.8 | 500 | 7.51 | 56.09 | 43.56 | 37.22 |
| 13.6 | 1000 | 7.50 | 57.42 | 45.21 | 42.92 |
| 27.2 | 1000 | 7.50 | 57.68 | 49.26 | 41.94 |
| 40.8 | 1000 | 7.51 | 57.99 | 46.07 | 43.03 |

As can be seen, well treatment fluids comprising TTPC and PQ and amphoteric surfactant maintained a higher percentage friction reduction over time compared to the control.

It will be appreciated that well treatment fluids according to the present invention may have desirable friction properties.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A well treatment fluid comprising (a) tri n-butyl n-tetradecyl phosphonium chloride (TTPC) and (b) a polymeric friction reducer, the polymeric friction reducer comprising a copolymer of acrylamide and acrylic acid, wherein the TTPC is provided in an amount such that the well treatment fluid exhibits a reduction in friction relative to the well treatment fluid lacking the TTPC.

2. A well treatment fluid according to claim 1 wherein the fluid further comprises at least one of a polymeric ammonium compound (c) or an amphoteric surfactant (d).

3. A well treatment fluid according to claim 1, wherein the polymeric friction reducer (b) comprises a copolymer of acrylamide and acrylic acid having an average molecular weight of from 12 million and wherein the fluid further comprises at least one of Poly[oxyethylene(dimethylimino)ethylene(dimethylimino)ethylene dichloride] or an alkyl iminodipropionate amphoteric surfactant.

4. A well treatment fluid according to claim 1, wherein the well treatment fluid comprises water, (a) TTPC and (b) polymeric friction reducer in a combined amount of at least 90% by weight.

5. A well treatment fluid according to claim 1, wherein the well treatment fluid further comprises an alkyl iminodipropionate amphoteric surfactant wherein the alkyl group is selected from the group consisting of 2-ethylhexyl-, octyl-, decyloxypropyl-, dodecyl-, coco- or tallow.

6. A well treatment fluid according to claim 1, wherein the well treatment fluid comprises (a) TTPC in an amount of at least 5 ppm, (b) polymeric friction reducer in an amount of at least 1 ppm and further comprises at least one of Poly[oxyethylene(dimethylimino)ethylene(dimethylimino)ethylene dichloride] in an amount of at least 1 ppm or an alkyl iminodipropionate amphoteric surfactant in an amount of at least 1 ppm.

7. A well treatment fluid according to claim 1, wherein the well treatment fluid further comprises Poly[oxyethylene(dimethylimino)ethylene(dimethylimino)ethylene dichloride] and an alkyl iminodipropionate amphoteric surfactant.

8. A method of modifying a well treatment fluid, the method comprising adding (a) tri n-butyl n-tetradecyl phosphonium chloride (TTPC) to a well treatment fluid, wherein the well treatment fluid comprises (b) a polymeric friction reducer, the polymeric friction reducer comprising a copolymer of acrylamide and acrylic acid, and wherein the method provides the well treatment fluid with a reduced friction.

9. A method according to claim 8, wherein the method comprises providing a well treatment fluid which further comprises at least one of a polymeric ammonium compound (c) or an amphoteric surfactant (d).

10. A method according to claim 8, wherein the polymeric friction reducer (b) comprises a copolymer of acrylamide and acrylic acid having an average molecular weight of from 12 million and wherein the method comprises providing a fluid which further comprises at least one of Poly[oxyethylene(dimethylimino)ethylene(dimethylimino)ethylene dichloride] or an alkyl iminodipropionate amphoteric surfactant.

11. A method according to claim 8, wherein the method further comprises adding Poly[oxyethylene(dimethylimino)ethylene(dimethylimino)ethylene dichloride] and an alkyl iminodipropionate amphoteric surfactant to the well treatment fluid.

12. A method according to claim 8, wherein the method comprises adding an aqueous composition comprising TTPC.

13. A method according to claim 8, wherein the well treatment fluid comprises a fluid prepared from brine.

14. A method according to claim 8, wherein the method comprises adding TTPC in an amount of at least 10 ppm and wherein the friction reduction exhibited after 10 minutes of circulation is at least 2% relative to the well treatment fluid lacking the TTPC.

* * * * *